(12) United States Patent
Dharmarajan et al.

(10) Patent No.: US 8,664,320 B2
(45) Date of Patent: Mar. 4, 2014

(54) ELASTIC FILM COMPOSITIONS WITH IMPROVED TEAR RESISTANCE

(71) Applicants: Narayanaswami Raja Dharmarajan, Houston, TX (US); Michael Glenn Williams, Houston, TX (US)

(72) Inventors: Narayanaswami Raja Dharmarajan, Houston, TX (US); Michael Glenn Williams, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 13/708,455

(22) Filed: Dec. 7, 2012

(65) Prior Publication Data

US 2013/0102732 A1 Apr. 25, 2013

Related U.S. Application Data

(62) Division of application No. 11/877,365, filed on Oct. 23, 2007, now Pat. No. 8,354,465.

(51) Int. Cl.
*C08L 23/10* (2006.01)
*C08L 23/04* (2006.01)
*C08L 53/02* (2006.01)

(52) U.S. Cl.
USPC .............................. 524/474; 524/490; 525/98

(58) Field of Classification Search
USPC ...................................... 525/98; 524/474, 490
See application file for complete search history.

(56) References Cited

U.S. PATENT DOCUMENTS

| 3,862,068 | A | 1/1975 | Russell |
| 4,554,304 | A | 11/1985 | Hansen et al. |
| 6,012,818 | A * | 1/2000 | Araki ............................ 359/529 |
| 6,984,696 | B2 | 1/2006 | Curry et al. |
| 7,244,787 | B2 | 7/2007 | Curry et al. |
| 2004/0192823 | A1 | 9/2004 | Curry et al. |
| 2004/0249046 | A1 | 12/2004 | Abhari et al. |
| 2009/0105418 | A1* | 4/2009 | Dharmarajan et al. ......... 525/95 |

OTHER PUBLICATIONS

Vector Styrenic Block Copolymers, Data Sheet: Vector 4211, Styrene-Isoprene-Styrene (SIS) Block Copolymer, Dexco Polymers LP, downloaded from www.dexcopolymers.com, Apr. 12, 2011.

* cited by examiner

*Primary Examiner* — Jeffrey Mullis

(57) ABSTRACT

A film composition comprising one or more propylene-based polymers and one or more hydrocarbon resins, and methods for making the same are provided. The propylene-based polymer may have (i) 60 wt % or more units derived from propylene, (ii) isotactically arranged propylene derived sequences, and (iii) a heat of fusion less than 65 J/g. The hydrocarbon resin may have a glass transition temperature greater than 20° C.

12 Claims, No Drawings

ELASTIC FILM COMPOSITIONS WITH IMPROVED TEAR RESISTANCE

PRIORITY

This application is a divisional of and claims priority to U.S. patent application Ser. No. 11/877,365, filed on Oct. 23, 2007, the disclosure of which is incorporated herein by reference in its entirety.

BACKGROUND OF THE INVENTION

1. Field of the Invention

Embodiments of the present invention generally relate to propylene-based polymers and films made therefrom. More particularly, embodiments of the present invention relate to films of propylene-based polymers having increased tear resistance.

2. Description of the Related Art

Materials with good stretchability and elasticity are used to manufacture a variety of disposable articles in addition to durable articles including incontinence pads, disposable diapers, training pants, clothing, undergarments, sports apparel, automotive trim, weather-stripping, gaskets, and furniture upholstery. For clothing, stretchability and elasticity are performance attributes that allow the materials to provide a closely conforming fit to the body of the wearer. Various types of elastic laminates have been used for such materials.

Elastic laminates, especially those used as diaper waist bands, leg cuffs, and elastic stretch engines, are intended to contact the wearer or user. As such, comfort is a primary design consideration. The comfort factor is a direct result of the stretchability and elasticity of the film; however, the stretchability and elasticity of the film usually comes with a price. As the stretchability and elasticity of the film increase, the films become less durable and more susceptible to tear.

There is a need, therefore, for improving the tear resistance of a film without compromising physical and elastic properties.

SUMMARY OF THE INVENTION

Film compositions and methods for making the same are provided. In at least one specific embodiment, the film can include one or more propylene-based polymers and one or more hydrocarbon resins. The propylene-based polymer can include (i) 60 wt % or more units derived from propylene, (ii) isotactically arranged propylene derived sequences, and (iii) a heat of fusion less than 65 J/g. The hydrocarbon resin can have a glass transition temperature greater than 20° C.

In at least one other specific embodiment, the film can include one or more propylene-based polymers having 60 wt % or more units derived from propylene, isotactically arranged propylene derived sequences, a heat of fusion less than 45 J/g, a density of at least 0.80 g/cm$^3$, and a MFR of at least 3.0 g/10 min; and one or more hydrogenated cycloaliphatic resin each having a molecular weight (Mn) of from 200 to 5,000 and a glass transition temperature greater than 20° C., wherein the amount of the hydrocarbon resin in the composition is sufficient to increase intrinsic tear of the film by at least 5%.

In at least one specific embodiment, the method for making the film composition can include admixing one or more propylene-based polymers and one or more miscible hydrocarbon resins in an amount sufficient to provide a film having an increase in intrinsic tear by at least 5% compared to a film without either the one or more propylene-based polymers or the one or more miscible hydrocarbon resins. The propylene-based polymer can include (i) 60 wt % or more units derived from propylene, (ii) isotactically arranged propylene derived sequences, and (iii) a heat of fusion less than 65 J/g. The hydrocarbon resin can have a glass transition temperature greater than 20° C.

DETAILED DESCRIPTION OF THE INVENTION

Films having significantly increased tear resistance with excellent stretchability and elasticity and methods for producing the same are provided. In one or more embodiments, the film includes one or more propylene-based polymers and one or more hydrocarbon resins. The film can further include polypropylene and/or one or more thermoplastic resins. In one or more embodiments, the film can include one or more rubber components and/or one or more additives. Preferably, the various components of the film are selected such that the film has an intrinsic tear of at least 1.5 gm/micron and preferably at least 3.9 gm/micron, and an elongation at break of at least 500%.

Propylene-Based Polymer

The propylene-based polymer can be propylene-α-olefin-diene terpolymers or propylene-α-olefin copolymers. For simplicity and ease of description, however, the term "propylene-based polymer" as used herein refers to both propylene-α-olefin-diene terpolymers and propylene-α-olefin copolymers.

The propylene-based polymer can be prepared by polymerizing propylene with one or more comonomers. In at least one specific embodiment, the propylene-based polymer can be prepared by polymerizing propylene with one or more dienes. In at least one other specific embodiment, the propylene-based polymer can be prepared by polymerizing propylene with ethylene and/or at least one $C_4$-$C_{20}$ α-olefin, or a combination of ethylene and at least one $C_4$-$C_{20}$ α-olefin and one or more dienes. The one or more dienes can be conjugated or non-conjugated. Preferably, the one or more dienes are non-conjugated.

The comonomers can be linear or branched. Preferred linear comonomers include ethylene or $C_4$ to $C_8$ α-olefins, more preferably ethylene, 1-butene, 1-hexene, and 1-octene, even more preferably ethylene or 1-butene. Preferred branched comonomers include 4-methyl-1-pentene, 3-methyl-1-pentene, and 3,5,5-trimethyl-1-hexene. In one or more embodiments, the comonomer can include styrene.

Illustrative dienes can include, but are not limited to, 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD), and combinations thereof. Preferably, the diene is ENB.

Preferred methods and catalysts for producing the propylene-based polymers are found in publications US 2004/0236042 and WO 05/049672 and in U.S. Pat. No. 6,881,800, which are all incorporated by reference herein. Pyridine amine complexes, such as those described in WO 03/040201 are also useful to produce the propylene-based polymers useful herein. The catalyst can involve a fluxional complex, which undergoes periodic intra-molecular re-arrangement so as to provide the desired interruption of stereoregularity as in U.S. Pat. No. 6,559,262. The catalyst can be a stereorigid complex with mixed influence on propylene insertion, see Rieger EP 1070087. The catalyst described in EP 1614699 may also be used for the production of backbones suitable for the invention.

The propylene-based polymer can have an average propylene content on a weight percent basis of from about 60 wt % to about 99.7 wt %, more preferably from about 60 wt % to about 99.5 wt %, more preferably from about 60 wt % to about 97 wt %, more preferably from about 60 wt % to about 95 wt % based on the weight of the polymer. In one embodiment, the balance comprises diene. In another embodiment, the balance comprises one or more dienes and one or more of the α-olefins described previously. Other preferred ranges are from about 80 wt % to about 95 wt % propylene, more preferably from about 83 wt % to about 95 wt % propylene, more preferably from about 84 wt % to about 95 wt % propylene, and more preferably from about 84 wt % to about 94 wt % propylene based on the weight of the polymer. The balance of the propylene-based polymer comprises a diene and optionally, one or more alpha-olefins. In one or more embodiments above or elsewhere herein, the alpha-olefin is butene, hexene or octene. In other embodiments, two alpha-olefins are present, preferably ethylene and one of butene, hexene or octene.

Preferably, the propylene-based polymer comprises about 0.3 wt % to about 24 wt % of a non-conjugated diene, based on the weight of the polymer, more preferably from about 0.5 wt % to about 12 wt %, more preferably about 0.6 wt % to about 8 wt %, and more preferably about 0.7 wt % to about 5 wt %. In other embodiments, the diene content ranges from about 0.3 wt % to about 10 wt %, more preferably from about 0.3 to about 5 wt %, more preferably from about 0.3 wt % to about 4 wt %, preferably from about 0.3 wt % to about 3.5 wt %, preferably from about 0.3 wt % to about 3.0 wt %, and preferably from about 0.3 wt % to about 2.5 wt % based on the weight of the polymer. In one or more embodiments above or elsewhere herein, the propylene-based polymer comprises ENB in an amount of from about 0.5 to about 4 wt %, more preferably from about 0.5 to about 2.5 wt %, and more preferably from about 0.5 to about 2.0 wt %.

In other embodiments, the propylene-based polymer preferably comprises propylene and diene in one or more of the ranges described above with the balance comprising one or more $C_2$ and/or $C_4$-$C_{20}$ olefins. In general, this will amount to the propylene-based polymer preferably comprising from about 5 to about 40 wt % of one or more $C_2$ and/or $C_4$-$C_{20}$ olefins based the weight of the polymer. When $C_2$ and/or a $C_4$-$C_{20}$ olefins are present the combined amounts of these olefins in the polymer is preferably at least about 5 wt % and falling within the ranges described herein. Other preferred ranges for the one or more α-olefins include from about 5 wt % to about 35 wt %, more preferably from about 5 wt % to about 30 wt %, more preferably from about 5 wt % to about 25 wt %, more preferably from about 5 wt % to about 20 wt %, more preferably from about 5 to about 17 wt % and more preferably from about 5 wt % to about 16 wt %.

The propylene-based polymer can have a weight average molecular weight (Mw) of 5,000,000 or less, a number average molecular weight (Mn) of about 3,000,000 or less, a z-average molecular weight (Mz) of about 10,000,000 or less, and a g' index of 0.95 or greater measured at the weight average molecular weight (Mw) of the polymer using isotactic polypropylene as the baseline, all of which can be determined by size exclusion chromatography, e.g., 3D SEC, also referred to as GPC-3D, as described herein.

In one or more embodiments above or elsewhere herein, the propylene-based polymer can have a Mw of about 5,000 to about 5,000,000 g/mole, more preferably a Mw of about 10,000 to about 1,000,000, more preferably a Mw of about 20,000 to about 500,000, or more preferably a Mw of about 50,000 to about 400,000, wherein Mw is determined as described herein.

In one or more embodiments above or elsewhere herein, the propylene-based polymer can have a Mn of about 2,500 to about 2,500,000 g/mole, more preferably a Mn of about 5,000 to about 500,000, more preferably a Mn of about 10,000 to about 250,000, or more preferably a Mn of about 25,000 to about 200,000, wherein Mn is determined as described herein.

In one or more embodiments above or elsewhere herein, the propylene-based polymer can have a Mz of about 10,000 to about 7,000,000 g/mole, more preferably a Mz of about 50,000 to about 1,000,000, more preferably a Mz of about 80,000 to about 700,000, or more preferably a Mz of about 100,000 to about 500,000, wherein Mz is determined as described herein.

The molecular weight distribution index (MWD=(Mw/Mn)), sometimes referred to as a "polydispersity index" (PDI), of the propylene-based polymer can be from about 1.5 to about 40. In some embodiments, the MWD can have an upper limit of 40, or 20, or 10, or 5, or 4.5, and a lower limit of 1.5, or 1.8, or 2.0. In one or more embodiments above or elsewhere herein, the MWD of the propylene-based polymer is about 1.8 to 5 and most preferably about 1.8 to 3. Techniques for determining the molecular weight (Mn and Mw) and molecular weight distribution (MWD) can be found in U.S. Pat. No. 4,540,753 (Cozewith, Ju and Verstrate) (which is fully incorporated herein by reference for purposes of U.S. practices) and references cited therein, in Macromolecules, 1988, volume 21, pg. 3360 (Verstrate et al.) (which is fully incorporated herein by reference for purposes of U.S. practice), and references cited therein, and in accordance with the procedures disclosed in U.S. Pat. No. 6,525,157, column 5, lines 1-44, which patent is fully incorporated herein by reference.

In one or more embodiments above or elsewhere herein, the propylene-based polymer can have a g' index value of 0.95 or greater, preferably at least 0.98, with at least 0.99 being more preferred, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the propylene-based polymer and $\eta_l$ is the intrinsic viscosity of a linear polymer of the same viscosity-averaged molecular weight ($M_v$) as the propylene-based polymer. $\eta_l = KM_v^\alpha$, where K and α are measured values for linear polymers and should be obtained on the same instrument as the one used for the g' index measurement.

In one or more embodiments above or elsewhere herein, the propylene-based polymer may have a density of about 0.85 g/cm$^3$ to about 0.92 g/cm$^3$, more preferably, about 0.87 g/cm$^3$ to 0.90 g/cm$^3$, more preferably about 0.88 g/cm$^3$ to about 0.89 g/cm$^3$ at room temperature as measured per the ASTM D-1505 test method.

In one or more embodiments above or elsewhere herein, the propylene-based polymer may have a melt flow rate (MFR, 2.16 kg weight @ 230° C.), equal to or greater than 0.2 g/10 min as measured according to the ASTM D-1238(A) test method as modified (described below). Preferably, the MFR (2.16 kg @ 230° C.) is from about 0.5 g/10 min to about 200 g/10 min and more preferably from about 1 g/10 min to about 100 g/10 min. In some embodiments, the propylene-based polymer has an MFR of 0.5 g/10 min to 200 g/10 min, especially from 2 g/10 min to 30 g/10 min, more preferably from 5 g/10 min to 30 g/10 min, more preferably 10 g/10 min to 30 g/10 min or more especially 10 g/10 min to about 25 g/10 min.

The propylene-based polymer may have a Mooney viscosity ML (1+4)@125° C., as determined according to ASTM D-1646, of less than 100, more preferably less than 75, even more preferably less than 60, most preferably less than 30.

In one or more embodiments above or elsewhere herein, the propylene-based polymer may have a heat of fusion (Hf) determined according to the DSC procedure described below which is greater than or equal to about 0.5 Joules per gram (J/g), and is ≤about 80 J/g, preferably ≤about 75 J/g, preferably ≤about 70 J/g, more preferably ≤about 60 J/g, more preferably ≤about 50 J/g, more preferably ≤about 45 J/g. Also preferably, the propylene-based polymer has a heat of fusion that is greater than or equal to about 1 J/g, preferably greater than or equal to about 5 J/g. In another embodiment, the propylene-based polymer can have a heat of fusion (Hf) which is from about 0.5 J/g to about 75 J/g, preferably from about 1 J/g to about 75 J/g, more preferably from about 0.5 J/g to about 35 J/g. Preferred propylene-based polymers and compositions can be characterized in terms of both their melting points (Tm) and heats of fusion, which properties can be influenced by the presence of comonomers or steric irregularities that hinder the formation of crystallites by the polymer chains. In one or more embodiments, the heat of fusion ranges from a lower limit of 1.0 J/g, or 1.5 J/g, or 3.0 J/g, or 4.0 J/g, or 6.0 J/g, or 7.0 J/g, to an upper limit of 30 J/g, or 35 J/g, or 40 J/g, or 50 J/g, or 60 J/g or 70 J/g, or 75 J/g, or 80 J/g.

The crystallinity of the propylene-based polymer can also be expressed in terms of percentage of crystallinity (i.e. % crystallinity). In one or more embodiments above or elsewhere herein, the propylene-based polymer has a % crystallinity of from 0.5% to 40%, preferably 1% to 30%, more preferably 5% to 25% wherein % crystallinity is determined according to the DSC procedure described below. In another embodiment, the propylene-based polymer preferably has a crystallinity of less than 40%, preferably about 0.25% to about 25%, more preferably from about 0.5% to about 22%, and most preferably from about 0.5% to about 20%. As disclosed above, the thermal energy for the highest order of polypropylene is estimated at 189 J/g (i.e., 100% crystallinity is equal to 189 J/g.).

In addition to this level of crystallinity, the propylene-based polymer preferably has a single broad melting transition. However, the propylene-based polymer can show secondary melting peaks adjacent to the principal peak, but for purposes herein, such secondary melting peaks are considered together as a single melting point, with the highest of these peaks (relative to a baseline as described herein) being considered the melting point of the propylene-based polymer.

The propylene-based polymer preferably has a melting point (measured by DSC) of equal to or less than 100° C., preferably less than 90° C., preferably less than 80° C., more preferably less than or equal to 75° C., preferably from about 25° C. to about 80° C., preferably about 25° C. to about 75° C., more preferably about 30° C. to about 65° C.

The Differential Scanning calorimetry (DSC) procedure can be used to determine heat of fusion and melting temperature of the propylene-based polymer. The method is as follows: about 0.5 grams of polymer is weighed out and pressed to a thickness of about 15-20 mils (about 381-508 microns) at about 140° C.-150° C., using a "DSC mold" and Mylar as a backing sheet. The pressed pad is allowed to cool to ambient temperature by hanging in air (the Mylar is not removed). The pressed pad is annealed at room temperature (23-25° C.) for about 8 days. At the end of this period, a disc of about 15-20 mg is removed from the pressed pad using a punch die and is placed in a 10 microliter aluminum sample pan. The sample is placed in a Differential Scanning calorimeter (Perkin Elmer Pyris 1 Thermal Analysis System) and is cooled to about −100° C. The sample is heated at 10° C./min to attain a final temperature of about 165° C. The thermal output, recorded as the area under the melting peak of the sample, is a measure of the heat of fusion and can be expressed in Joules per gram of polymer and is automatically calculated by the Perkin Elmer System. The melting point is recorded as the temperature of the greatest heat absorption within the range of melting of the sample relative to a baseline measurement for the increasing heat capacity of the polymer as a function of temperature.

The propylene-based polymer can have a triad tacticity of three propylene units, as measured by $^{13}C$ NMR, of 75% or greater, 80% or greater, 82% or greater, 85% or greater, or 90% or greater. Preferred ranges include from about 50 to about 99%, more preferably from about 60 to about 99%, more preferably from about 75 to about 99% and more preferably from about 80 to about 99%; and in other embodiments from about 60 to about 97%. Triad tacticity is determined by the methods described in U.S. Patent Application Publication 2004/0236042.

In one or more embodiments above or elsewhere herein, the propylene-based polymer can be a blend of discrete random propylene-based polymers. Such blends can include ethylene-based polymers and propylene-based polymers, or at least one of each such ethylene-based polymers and propylene-based polymers. The number of propylene-based polymers can be three or less, more preferably two or less.

In one or more embodiments above or elsewhere herein, the propylene-based polymer can include a blend of two propylene-based polymers differing in the olefin content, the diene content, or both.

In one or more embodiments above or elsewhere herein, the propylene-based polymer can include a propylene based elastomeric polymer produced by random polymerization processes leading to polymers having randomly distributed irregularities in stereoregular propylene propagation. This is in contrast to block copolymers in which constituent parts of the same polymer chains are separately and sequentially polymerized.

In another embodiment, the propylene-based polymers can include copolymers prepared according the procedures in WO 02/36651. Likewise, the propylene-based polymer can include polymers consistent with those described in WO 03/040201, WO 03/040202, WO 03/040095, WO 03/040201, WO 03/040233, and/or WO 03/040442. Additionally, the propylene-based polymer can include polymers consistent with those described in EP 1 233 191, and U.S. Pat. No. 6,525,157, along with suitable propylene homo- and copolymers described in U.S. Pat. No. 6,770,713 and U.S. Patent Application Publication 2005/215964, all of which are fully incorporated herein by reference. The propylene-based polymer can also include one or more polymers consistent with those described in EP 1 614 699 or EP 1 017 729.

Grafted (Functionalized) Backbone

In one or more embodiments, the propylene-based polymer can be grafted (i.e., "functionalized"). As used herein, the term "grafting" denotes covalent bonding of the grafting monomer to a polymer chain of the propylene-based polymer. The grafting monomer can be one or more ethylenically unsaturated carboxylic acids or acid derivatives, such as an acid anhydride, ester, salt, amide, imide, acrylates or the like.

Illustrative grafting monomers include but are not limited to acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo (2.2.1)heptene-2,3-dicarboxylic acid anhydride, maleopimaric acid, tetrahydrophtalic anhydride, norbornene-2,3-dicarboxylic acid anhydride, nadic anhydride, methyl nadic anhydride, himic anhydride, methyl himic anhydride, and x-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer.

In one or more embodiments, the grafted propylene based polymer includes about 0.5 to about 10 wt % ethylenically unsaturated carboxylic acid or acid derivative, more preferably from about 0.5 to about 6 wt %, more preferably from about 0.5 to about 3 wt %; in other embodiments from about 1 to about 6 wt %, more preferably from about 1 to about 3 wt %. In a preferred embodiment wherein the graft monomer is maleic anhydride, the maleic anhydride concentration in the grafted polymer is preferably in the range of about 1 to about 6 wt %, preferably at least about 0.5 wt % and highly preferably about 1.5 wt %.

Styrene and derivatives thereof such as paramethyl styrene, or other higher alkyl substituted styrenes such as t-butyl styrene can be used as a charge transfer agent in the presence of the grafting monomer to inhibit chain scission. This allows further minimization of the beta scission reaction and the production of a higher molecular weight grafted polymer (MFR equal to about 1.5).

Preparing Grafted Propylene-Based Polymers

The grafted propylene-based polymer can be prepared using conventional techniques. For example, the graft polymer can be prepared in solution, in a fluidized bed reactor, or by melt grafting. A preferred grafted polymer can be prepared by melt blending in a shear-imparting reactor, such as an extruder reactor. Single screw or twin screw extruder reactors such as co-rotating intermeshing extruder or counter-rotating non-intermeshing extruders, and co-kneaders such as those sold by Buss are also preferred.

In one or more embodiments, the grafted polymer can be prepared by melt blending the ungrafted propylene-based polymer with a free radical generating catalyst, such as a peroxide inititator, in the presence of the grafting monomer. The preferred sequence for the grafting reaction includes melting the propylene-based polymer, adding and dispersing the grafting monomer, introducing the peroxide and venting the unreacted monomer and by-products resulting from the peroxide decomposition. Other sequences can include feeding the monomers and the peroxide pre-dissolved in a solvent.

Illustrative peroxide initiators include but are not limited to: diacyl peroxides such as benzoyl peroxide; peroxyesters such as tert-butyl peroxy benzoate, tert-butylperoxy acetate, 00-tert-butyl-0-(2-ethylhexyl)monoperoxy carbonate; peroxyketals such as n-butyl-4,4-di-(tert-butyl peroxy) valerate; and dialkyl peroxides such as 1,1-bis(tertbutylperoxy)cyclohexane, 1,1-bis(tert-butylperoxy)-3,3,5-trimethylcyclohexane, 2,2-bis(tert-butylperoxy)butane, dicumyl-peroxide, tert-butylcumylperoxide, di-(2-tert-butylperoxy-isopropyl-(2)) benzene, di-tert-butylperoxide (DTBP), 2,5-dimethyl-2,5-di (tert-butylperoxy)-hexane, 2,5-dimethyl-2,5-di(tert-butylperoxy)-hexyne, 3,3,5,7,7-pentamethyl 1,2,4-trioxepane; and the like.

Hydrocarbon Resin

The one or more hydrocarbon resins may be grafted or ungrafted. Optionally, the resin may be hydrogenated. Preferably, the one or more hydrocarbon resins are low molecular weight hydrocarbon(s) that are compatible with the core layer. The resin may have a number average molecular weight (Mn) less than about 5000, preferably less than about 2000, most preferably in the range of from about 500 to about 1000. The resin may be natural or synthetic and, in some embodiments, may have a softening point in the range of from about 60° C. to about 180° C.

Suitable hydrocarbon resins can include, but are not limited to, petroleum resins, terpene resins, styrene resins, and cyclopentadiene resins. In one or more embodiments, the hydrocarbon resin is selected from the group consisting of aliphatic hydrocarbon resins, hydrogenated aliphatic hydrocarbon resins, aliphatic/aromatic hydrocarbon resins, hydrogenated aliphatic/aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and combinations thereof.

Suitable hydrocarbon resins include EMPR 120, 104, 111, 106, 112, and 115, EMFR 100 and 100A, ECR-373 and ESCOREZ® 2101, 2203, 2520, 5380, 5600, 5618, and 5690 (commercially available from ExxonMobil Chemical Company of Baytown, Tex., USA); ARKON™ M90, M100, M115 and M135 and SUPER ESTER™ rosin esters (commercially available from Arakawa Chemical Company of Japan); SYLVARES™ phenol modified styrene, methyl styrene resins, and styrenated terpene resins, ZONATAC™ terpene-aromatic resins, and terpene phenolic resins (commercially available from Arizona Chemical Company of Jacksonville, Fla., USA); SYLVATAC™ and SYLVALITE™ rosin esters (commercially available from Arizona Chemical Company of Jacksonville, Fla., USA); NORSOLENE™ aliphatic aromatic resins (commercially available from Cray Valley of France); DERTOPHENE™ terpene phenolic resins (commercially available from DRT Chemical Company of Landes, France); EASTOTAC™ resins, PICCOTAC™ $C_5/C_9$ resins, REGALITE™ and REGALREZ™ aromatic and REGALITE™ cycloaliphatic/aromatic resins (commercially available from Eastman Chemical Company of Kingsport, Tenn.); WINGTACK™ ET and EXTRA™ (commercially available from Sartomer of Exton, Pa., USA); FORAL™, PENTALYN™, and PERMALYN™ rosins and rosin esters (commercially available from Hercules, now Eastman Chemical Company of Kingsport, Tenn., USA); QUINTONE™ acid modified $C_5$ resins, $C_5/C_9$ resins, and acid modified $C_5/C_9$ resins (commercially available from Nippon Zeon of Japan); LX™ mixed aromatic/cycloaliphatic resins (commercially available from Neville Chemical Company of Pittsburgh, Pa., USA); CLEARON™ hydrogenated terpene aromatic resins (commercially available from Yasuhara of Japan); and PICCOLYTE™ (commercially available from Loos & Dilworth, Inc. of Bristol, Pa., USA). Other suitable hydrocarbon resins may be found in U.S. Pat. No. 5,667,902.

Preferred hydrocarbon resins include saturated alicyclic resins. Such resins, if used, may have a softening point in the range of from about 85° C. to about 140° C., or preferably in the range of about 100° C. to about 140° C., as measured by the ring and ball technique. Examples of suitable, commercially available saturated alicyclic resins are ARKON-P® resins (commercially available from Arakawa Forest Chemical Industries, Ltd., of Japan).

The amount of the one or more hydrocarbon resins, either alone or in combination, in the film is preferably less than about 20 wt %, and more preferably in the range of from about 1 wt % to about 5 wt %, based on the total weight of the core layer.

Polypropylene

The term "polypropylene" as used herein broadly means any polymer that is considered a "polypropylene" by persons skilled in the art (as reflected in at least one patent or publication), and includes homo, impact, and random polymers of propylene. Preferably, the polypropylene used in the compositions described has a melting point above 110° C., includes at least 90 wt % propylene units, and contains isotactic sequences of those units. The polypropylene can also include atactic sequences or syndiotactic sequences, or both. The polypropylene can either derive exclusively from propylene monomers (i.e., having only propylene units) or derive from mainly propylene (more than 80% propylene) with the remainder derived from olefins, particularly ethylene, and/or $C_4$-$C_{10}$ alpha-olefins. The polypropylene can have a high MFR (e.g., from a low of 10, or 15, or 20 g/10 min to a high of 25 to 30 g/10 min). The polypropylene can also have a lower MFR, e.g., "fractional" polypropylenes which have an MFR less than 1.0. Those with high MFR are preferred for ease of processing or compounding.

In one or more embodiments, the polypropylene is or includes isotactic polypropylene. Preferably, the polypropylene contains one or more crystalline propylene homopolymers or copolymers of propylene having a melting temperature of from 110° C. to 170° C. or higher as measured by DSC. Preferred copolymers of propylene include, but are not limited to, terpolymers of propylene, impact copolymers of propylene, random polypropylene and mixtures thereof. Preferred comonomers have 2 carbon atoms, or from 4 to 12 carbon atoms. Preferably, the comonomer is ethylene. Such polypropylenes and methods for making the same are described in U.S. Pat. No. 6,342,565.

The term "random polypropylene" as used herein broadly means a single phase copolymer of propylene having up to 9 wt %, preferably 2 wt % to 8 wt % of an alpha olefin comonomer. Preferred alpha olefin comonomers have 2 carbon atoms, or from 4 to 12 carbon atoms. Preferably, the alpha olefin comonomer is ethylene.

Thermoplastic Resin

The thermoplastic resin is or includes an olefinic thermoplastic resin. The "olefinic thermoplastic resin" can be any material that is not a "rubber" and that is a polymer or polymer blend considered by persons skilled in the art as being thermoplastic in nature, e.g., a polymer that softens when exposed to heat and returns to its original condition when cooled to room temperature. The olefinic thermoplastic resin can contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers.

Illustrative polyolefins can be prepared from mono-olefin monomers including, but not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferably, the olefinic thermoplastic resin is unvulcanized or non cross-linked. In embodiments where the film includes polypropylene, the thermoplastic resin is not a polypropylene.

Rubber

The rubber component can include one or more olefinic rubbers such as non-polar, rubbery copolymers of two or more alpha-monoolefins, preferably copolymerized with at least one polyene, usually a diene. Saturated monoolefin copolymer rubber, for example, ethylene/propylene copolymer rubber (EPM; about 45 to about 80% by weight of ethylene) or unsaturated monoolefin rubber such as ethylene/propylene/diene (EPDM; about 45 to about 80% by weight of ethylene, about 0.1 to about 15% by weight of non-conjugated diene, remainder being propylene) rubber can be used. EPDM is a terpolymer of ethylene, propylene and a non-conjugated diene. Satisfactory non-conjugated dienes include 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD) and vinyl norbornene (VNB).

Another olefinic rubber can include a C4-7 isomonoolefin and a para-C1-4 alkylstyrene and, preferably, a halogenated derivative thereof. The amount of halogen in the copolymer, predominantly in the para-alkylstyrene, is from about 0.1 to 10 wt %. A preferred example is the brominated copolymer of isobutylene and para-methylstyrene. These copolymers are more fully described in U.S. Pat. No. 5,162,445, the disclosure of which is fully incorporated herein by reference.

The rubber component can also include one or more styrenic block copolymers. Such block-copolymers can include styrene/conjugated diene/styrene, with the conjugated diene optionally being fully or partially hydrogenated, or mixtures thereof. Generally this block-copolymer can contain about 10 to about 50 wt %, more preferably about 25 to about 35 wt % of styrene and about 90 to about 50 wt %, more preferably about 75 to about 65 wt % of the conjugated diene, based on said block-copolymer. Most preferably, however, is a block-copolymer which contains about 30 wt % of styrene and about 70 wt % of the conjugated diene. The conjugated diene can be selected from butadiene, isoprene or mixtures thereof. Specific block-copolymers of the styrene/conjugated diene/styrene-type are SBS, SIS, SIBS, SEBS and SEPS block-copolymers.

Butyl rubbers may also be used. The term "butyl rubber" includes copolymers of an isoolefin and a conjugated monoolefin, terpolymers of an isoolefin with or without a conjugated monoolefin, divinyl aromatic monomers and the halogenated derivatives of such copolymers and terpolymers. Useful butyl rubber copolymers include a major portion of isoolefin and a minor amount, usually less than about 30 wt %, of a conjugated multi-olefin. The preferred copolymers include about 85 to 99.5 wt % of a $C_{4-7}$ isoolefin such as isobutylene and about 15 to 0.5 wt % of a multi-olefin of 4 to 14 carbon atoms, such as isoprene, butadiene, dimethyl butadiene and piperylene. Commercial butyl rubber, chlorobutyl rubber, and bromobutyl rubber, useful in the invention, are copolymers of isobutylene and minor amounts of isoprene with less than about 3% halogen for the halobutyl-derivatives. Other butyl co- and terpolymer rubbers are illustrated by the description in U.S. Pat. No. 4,916,180, the disclosure of which is fully incorporated herein by reference.

Natural rubber may also be used. The main constituent of natural rubber is the linear polymer cis-1,4-polyisoprene. It is normally commercially available in the form of smoked sheets and crepe. Synthetic polyisoprene may also be used. Furthermore, polybutadiene rubber and styrene-butadiene-copolymer rubbers may also be used.

In one or more embodiments, nitrite rubbers can be used. Examples of a nitrite group-containing rubber include a copolymer rubber comprising an ethylenically unsaturated nitrite compound and a conjugated diene. Further, the copolymer rubber can be one in which the conjugated diene units of the copolymer rubber are hydrogenated. Specific examples of the ethylenically unsaturated nitrile compound include acrylonitrile, alpha-chloroacrylonitrile, alpha-fluoroacrylonitrile and methacrylonitrile. Among them, acrylonitrile is preferred. Examples of the conjugated diene include 1,3-butadiene, 2-chlorobutadiene and 2-methyl-1,3-butadiene (isoprene). Among them, butadiene is preferred. Preferred nitrite rubbers include copolymers of 1,3-butadiene and about 10 to about 50 percent of acrylonitrile.

Slip Agents

In one or more embodiments, the polymer composition may include one or more slip agents. Illustrative slip agents include fatty acids, higher aliphatic acid amides, higher aliphatic acid esters, waxes and metal soaps. In one or more embodiments, the slip agents can include one or more amides such as behenamide, erucamide, N-(2-hydroxyethyl) erucamide, lauramide, N,N'-ethylene bis-olamide, oleamide, oleyl palmitamide, stearyl erucamide, tallow amide, blends thereof, and combinations thereof. In one or more embodiments, the slip agents are added to the blend in amounts ranging from about 0.1 to about 2 weight percent based on the total weight of the blend.

Blending and Additives

In one or more embodiments, the one or more propylene-based polymers, thermoplastic resins, slip agents, and/or hydrocarbon resins can be blended by melt-mixing to form a blend. In one or more embodiments, the blend contains no processing oil. In other words, the blend is processed in the absence of processing oil. The blend may be prepared and mixed using any appropriate method known to those having skill in the art, for example, extruders with kneaders or mixing elements with one or more mixing tips or flights, extruders with one or more screws, extruders of co or counter rotating type, Banbury mixers, Farrell Continuous mixers, or Buss Kneaders. The type and intensity of mixing, temperature, and residence time required can be achieved by the choice of one of the above machines in combination with the selection of kneading or mixing elements, screw design, and screw speed (typically <3000 RPM).

In one or more embodiments, the films described can be used as one or more layers in a multi-film or laminate system. For example, an elastic laminate having one or more facing layers disposed at least partially about one or more inner layers is provided. In one or more embodiments, the one or more facing layers may include at least 60 wt %, at least 70 wt %, at least 80 wt %, at least 90 wt %, or at least 95 wt % of the propylene-based polymer.

In one or more embodiments, the facing layer can include the propylene-based polymer in an amount ranging from a low of about 60, 70, or 75 wt % to a high of about 80, 90, 95 wt %. In one or more embodiments, the facing layer can include polypropylene in an amount ranging from a low of about 5, 10 or 20 wt % to a high of about 25, 30, or 40 wt %. In one or more embodiments, the facing layer can include one or more thermoplastic resins in an amount ranging from a low of about 5, 10 or 20 wt % to a high of about 25, 30, or 40 wt %.

In one or more embodiments, the facing layer may include about 70 wt % to about 95 wt % of the propylene-based polymer and about 5 wt % to about 30 wt % of polypropylene. In one or more embodiments, the facing layer may include about 65 wt % to about 80 wt % of the propylene-based polymer and about 20 wt % to about 35 wt % of polypropylene. When the one or more thermoplastic resins are present, the facing layer blend may include about 60 wt % to about 95 wt % of the propylene-based polymer and about 5 wt % to about 40 wt % of polypropylene.

In one or more embodiments, the one or more inner layers may include at least 60 wt %, at least 70 wt %, at least 80 wt %, at least 90 wt %, or at least 95 wt % of the propylene-based polymer.

In one or more embodiments, the one or more inner layers may include from about 2 to about 30 wt % of the one or more slip agents. In one or more embodiments, the one or more inner layers may include from about 0.2 wt % to about 20 wt % of the one or more slip agents. In one or more embodiments, the one or more inner layers may include from about 0.2 wt % to about 10 wt % of the one or more slip agents. In one or more embodiments, the one or more inner layers may include from about 0.2 wt % to about 5 wt % of the one or more slip agents. In one or more embodiments, the one or more inner layers may include the one or more slip agents in an amount ranging from a low of about 0.2 wt %, 0.5 wt % or 1 wt % to a high of about 2 wt %, 5 wt % or 10 wt %.

In one or more embodiments, the one or more inner layers may include from about 2 to about 30 wt % of the one or more hydrocarbon resins. In one or more embodiments, the one or more inner layers may include from about 0.2 wt % to about 20 wt % of the one or more hydrocarbon resins. In one or more embodiments, the one or more inner layers may include from about 0.2 wt % to about 10 wt % of the one or more hydrocarbon resins. In one or more embodiments, the one or more inner layers may include from about 0.2 wt % to about 5 wt % of the one or more hydrocarbon resins. In one or more embodiments, the one or more inner layers include the one or more hydrocarbon resins in an amount ranging from a low of about 0.2 wt %, 0.5 wt % or 1 wt % to a high of about 2 wt %, 5 wt % or 10 wt %.

In one or more embodiments, the inner layer or facing layer may contain additional additives, which can be introduced at the same time as the other components, or later downstream in case of using an extruder or Buss kneader, or merely later in time. Examples of such additives are antioxidants, antiblocking agents, antistatic agents, ultraviolet stabilizers, foaming agents, and processing aids. Such additives may include from about 0.1 to about 10 percent by weight based on the total weight of blend. The additives can be added to the blend by any method acceptable to persons skilled in the art, for example in pure form or in master batches.

Articles

The polymer composition described may be used to form a variety of articles, including but not limited to consumer and industrial goods. Illustrative consumer articles include but are not limited to incontinence pads, personal hygiene articles, disposable diapers, training pants, clothing, undergarments, sports apparel, face masks, gowns, and filtration media. The terms "nonwoven, "nonwoven fabric," and "nonwoven web," as used herein, are used interchangeably and refer to a web or fabric that has a structure of individual fibers or filaments that are randomly interlaid, but not in an identifiable repeating pattern.

The terms "elastic" and "semi-elastic" refer to any material having a tension set of 80% or less, or 60% or less, or 50% or less, or 25% or less at 100% elongation and at a temperature between the glass transition temperature and the crystalline melting point. Elastic polymer materials and compositions are also referred to in the art as "elastomers" and/or "elastomeric."

Preferably, a nonwoven fabric is layered with one or more facing layers thermally bonded to one or more inner layers. Each layer may be either spunbonded or meltblown to from a single fabric layer. Accordingly, the layered nonwoven fabric can include numerous combinations of spunbonded (S) and meltblown (M) layers including but not limited to spunbond-spunbond (SS), spunbond-meltblown-spunbond (SMS), spunbond-spunbond-spunbond (SSS), spunbond-meltblown-meltblown-spunbond (SMMS) spunbond-spunbond-spunbond (SS-SS), spunbond-meltblown or vice versa (SM or MS), spunbond-meltblown-spunbond-spunbond-meltblown-spunbond (SMS-SMS), spunbond-meltblown-meltblown-spunbond-spunbond-meltblown-meltblown-spunbond (SMMS-SMMS) arrangements, as well as many other combinations and variations of the foregoing. The multiple fabric layers are then bonded together by the application of heat and pressure to form the desired fabric composite. The spunbonded fabric layers may be prebonded by heated press rolls to provide structural integrity to the fabric.

As mentioned above, the one or more facing layers may be thermally bonded to the one or more inner layers. The layers can be thermally bonded using a calendering process or any other process known in the art. It is believed that the inner layer(s) containing one or more slip agents and/or one or more hydrocarbon resins eliminates the "rubbery feel" that is intrinsic to an unmodified elastic nonwoven. As such, the modified elastic nonwoven has an appealing touch to the wearer.

As used herein, the terms "thermal bonding" and "thermally bonded" refer to the heating of fibers to effect the melting (or softening) and fusing of fibers such that a nonwoven fabric is produced. Thermal bonding includes calendar bonding and through-air bonding, as well as other methods known in the art.

Considering fabrics in more detail, melt blown fabrics are generally webs of fine filaments having a fiber diameter in the range of from about 0.1 to about 20 microns. Typical fiber diameters for melt blown fabrics are in the range of from 1 to 10 microns, or from 1 to 5 microns. The nonwoven webs formed by these fine fiber diameters have very small pore sizes and can, therefore, have excellent barrier properties.

The meltblown layers may be prepared by extruding the blend in molten form through a plurality of fine, usually circular capillaries of a die. A high-velocity, usually heated gas (e.g., air) stream attenuates the filaments of molten thermoplastic material to reduce their diameter. Thereafter the meltblown fibers, which include any melt processable additives that were present in the blend, are carried by the high-velocity heated gas stream and are deposited on a collecting surface to form a nonwoven web of randomly dispersed meltblown fibers.

The spunbonded layers may be produced by continuously extruding the blend through a plurality of fine, usually circular capillaries of a spinnerette having typically 1000 holes per meter length, or with banks of smaller spinnerets, with each spinneret section containing as few as 40 holes. After exiting the spinneret, the molten fibers are quenched by a cross-flow air quench system, then pulled away from the spinneret and attenuated (drawn) by high speed air. The friction between the flowing air and the filaments creates a force which draws the filaments, i.e., attenuates the filaments to a smaller diameter. The filaments are drawn to achieve molecular orientation and tenacity. The continuous filaments are then deposited in a substantially random manner to form a web of substantially continuous and randomly arranged, molecularly oriented filaments. The web is then passed through compaction rolls and then between heated calender rolls where the raised lands on one roll bond the web at points covering 10% to 40% of its area to form a nonwoven fabric. The top calender roll may have an embossed pattern while the bottom roll is typically smooth.

In one or more embodiments, any one of the one or more facing layers and the one or more inner layers may be a multicomponent layer. The term "multicomponent" as used herein, refers to fibers which have been formed from at least two polymers extruded from separate extruders and meltblown or spun together to form one fiber. Multicomponent fibers are also referred to in the art as bicomponent fibers. The polymers used in multicomponent fibers are typically different from each other; however, conjugated fibers can be monocomponent fibers. The polymers can be arranged in distinct zones across the cross-section of the conjugated fibers and extend continuously along the length of the conjugated fibers. The configuration of conjugated fibers can be, for example, a sheath/inner arrangement wherein one polymer is surrounded by another, a side by side arrangement, a pie arrangement or an "islands-in-the-sea" arrangement. Conjugated fibers are described in U.S. Pat. Nos. 5,108,820; 5,336,552; and 5,382,400; the entire disclosures of which are hereby incorporated herein by reference. In some embodiments, the fibers described herein may be part of a conjugated configuration.

In one or more embodiments, the fibers may be in the form of continuous filament yarn, partially oriented yarn, and/or staple fibers. Continuous filament yarns typically range from 40 denier to 20,000 denier (denier=number of grams per 9000 yards). Filaments generally range from 1 to 20 or more denier per filament (dpf). Spinning speeds are typically 800 m/min to 1500 m/min (2500 ft/min to 5000 ft/min).

Partially oriented yarn (POY) is the fiber produced directly from fiber spinning without solid state drawing, as in the continuous filament. The orientation of the molecules in the fiber is done in the melt state just after the molten polymer leaves the spinneret.

Staple fiber filaments can range, for example, from 1.5 dpf to 70 dpf or more, depending on the application. There are two basic staple fiber fabrication processes: traditional and compact spinning. The traditional process typically involves two steps: 1) producing, applying, finishing, and winding, followed by 2) drawing, a secondary finish application, crimping, and cutting into the staple. During the traditional spinning process, a 'triangle' is created as fibers are drawn out of an apparatus. Compact spinning minimizes or eliminates the triangle, and may reduce the amount of stray fibers and weak spots in a thread. It is called 'compact' because outside fibers are compacted towards the core of the yarn as they are twisted.

In some embodiments, the fabrics can be further processed. For example, the fabric can be subjected to a surface treatment process, such as sizing. Thus, in some embodiments, the fabric can contain sizing additives such as rosins, resins, or waxes. As another example, the fabric can be subjected to a tentering process. In one or more embodiments above, blocking agents can be added to the fabric in a processing step subsequent to the formation of the fabric.

Definitions and Test Methods

For purposes of convenience, various definitions and specific test procedures are identified below. However, if a person of ordinary skill wishes to determine whether a composition or polymer has a particular property identified in a claim herein, then any published or well-recognized method or test procedure can be followed to determine that property, although the specifically identified procedure is preferred. Each claim should be construed to cover the results of any of such procedures, even to the extent different procedures may yield different results or measurements. Thus, a person of ordinary skill in the art is to expect experimental variations in measured properties that are reflected in the claims. All numerical values can be considered to be "about" or "approximately" the stated value, in view of the nature of testing in general.

Comonomer Content:

The comonomer content and sequence distribution of the polymers can be measured using $^{13}$C nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with gel permeation chromatography (GPC), as described in Wheeler and Willis, Applied Spectroscopy, 1993, Vol. 47, pp. 1128-1130.

In the particular case of propylene-ethylene copolymers containing greater than 75 wt % propylene, the comonomer content may be measured as follows. A thin homogeneous film is pressed at a temperature of about 150° C. or greater, and mounted on a Perkin Elmer PE 1760 infrared spectrophotometer. A full spectrum of the sample from 600 cm$^{-1}$ to 4000 cm$^{-1}$ is recorded and the monomer weight percent of ethylene can be calculated according to the following equation: Ethylene wt %=82.585-111.987X+30.045X$^2$, where X is the ratio of the peak height at 1155 cm$^{-1}$ and peak height at either 722 cm$^{-1}$ or 732 cm$^{-1}$, whichever is higher.

Polyene Content:

The amount of polyene present in a polymer may be inferred by the quantitative measure of the amount of the pendant free olefin present in the polymer after polymerization. Several procedures such as iodine number and the determination of the olefin content by H$^1$ or $^{13}$C nuclear magnetic resonance (NMR) have been established. In embodiments described herein where the polyene is ENB, the amount of polyene present in the polymer can be measured using ASTM D-3900.

Isotactic:

The term "isotactic" is defined herein as a polymer sequence in which greater than 50% of the pairs of pendant methyl groups located on adjacent propylene units, which are inserted into the chain in a regio regular 1,2 fashion and are not part of the backbone structure, are located either above or below the atoms in the backbone chain, when such atoms in the backbone chain are all in one plane. Certain combinations of polymers in blends or polymer sequences within a single polymer are described as having "substantially the same tacticity," which herein means that the two polymers are both isotactic according to the definition above.

Tacticity:

The term "tacticity" refers to the stereoregularity of the orientation of the methyl residues from propylene in a polymer. Pairs of methyl residues from contiguous propylene units identically inserted which have the same orientation with respect to the polymer backbone are termed "meso" (m). Those of opposite configuration are termed "racemic" (r). When three adjacent propylene groups have methyl groups with the same orientation, the tacticity of the triad is 'mm'. If two adjacent monomers in a three monomer sequence have the same orientation, and that orientation is different from the relative configuration of the third unit, the tacticity of the triad is 'mr'. When the middle monomer unit has an opposite configuration from either neighbor, the triad has 'rr' tacticity. The fraction of each type of triad in the polymer can be determined and when multiplied by 100 indicates the percentage of that type found in the polymer.

The triad tacticity of the polymers described herein can be determined from a $^{13}$C nuclear magnetic resonance (NMR) spectrum of the polymer as described below and as described in U.S. Pat. No. 5,504,172, the disclosure of which is hereby incorporated herein by reference.

Tacticity Index:

The tacticity index, expressed herein as "m/r", is determined by $^{13}$C nuclear magnetic resonance (NMR). The tacticity index m/r is calculated as defined in H. N. Cheng, Macromolecules, pg. 17, 1950 (1984). An m/r ratio of 1.0 generally describes a syndiotactic polymer, and an m/r ratio of 2.0 generally describes an atactic material. An isotactic material theoretically can have a ratio approaching infinity, and many by-product atactic polymers have sufficient isotactic content to result in ratios of greater than 50.

Melting Point and Heat of Fusion:

The melting point (Tm) and heat of fusion of the polymers described herein can be determined by Differential Scanning calorimetry (DSC), using the ASTM E-794-95 procedure. About 6 to 10 mg of a sheet of the polymer which has been pressed at approximately 200° C. to 230° C. is removed with a punch die and annealed at room temperature for 48 hours. At the end of this period, the sample is placed in a Differential Scanning calorimeter (Perkin Elmer Pyris One Analysis System and cooled to about −50° C. to −70° C. The sample is heated at about 20° C./min to attain a final temperature of about 180° C. to 200° C. The term "melting point," as used herein, is the highest peak among principal and secondary melting peaks as determined by DSC, discussed above. The thermal output is recorded as the area under the melting peak of the sample, which is typically at a maximum peak at about 30° C. to about 175° C. and occurs between the temperatures of about 0° C. and about 200° C. The thermal output is measured in Joules as a measure of the heat of fusion. The melting point is recorded as the temperature of the greatest heat absorption within the range of melting of the sample.

Molecular Weight and Molecular Weight Distribution:

The molecular weight and molecular weight distribution of the polymers described herein can be measured as follows. Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight Mz/Mw.

Mz, Mw, and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where Ni is the number of molecules having a molecular weight Mi. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., Polymer Molecular Weights Part II, Marcel Dekker, Inc., NY, (1975) pp. 287-368; Rodriguez, F., Principles of Polymer Systems 3$^{rd}$ ed., Hemisphere Pub. Corp., NY, (1989) pp. 155-160; U.S. Pat. No. 4,540,753; Verstrate et al., Macromolecules, Vol. 21, (1988) pg. 3360; and references cited therein.

Mooney Viscosity:

Mooney viscosity, as used herein, is measured as ML(1+4) @ 125° C. according to ASTM D-1646.

Melt Flow Rate and Melt Index:

The determination of the Melt Flow Rate (MFR) and the Melt Index (MI) of the polymer is made according to ASTM D-1238 using modification 1 with a load of 2.16 kg. In this version of the method, a portion of the sample extruded during the test is collected and weighed. The sample analysis is conducted at 230° C. with a 1 minute preheat on the sample to provide a steady temperature for the duration of the experiment. This data, expressed as dg of sample extruded per minute, is indicated as MFR. In an alternative procedure, the test is conducted in an identical fashion except at a temperature of 190° C. This data is referred to as MI@190° C.

Isotacticity Index:

The isotacticity index is calculated according to the procedure described in EP 0 374 695A2. The IR spectra of a thin film of the material is recorded and the absorbance at 997 cm$^{-1}$ and the absorbance at 973 cm$^{-1}$ are determined. The quotient of the absorbance at 997 cm$^{-1}$ to the absorbance at 973 cm$^{-1}$ is multiplied by 100 to yield the isotacticity index. In the determination of the absorbance at these two positions, the position of zero absorbance is the absorbance when there is no analytical sample present in the sample beam.

EXAMPLES

The foregoing discussion may be further described with reference to the following non-limiting examples. The examples illustrate the advantages and effects of films having one or more hydrocarbon resins added to one or more propylene-based polymers. The examples formulated according to one or more embodiments described provided films with significantly improved tear properties with minimal to no loss in elastic properties. The most notable improved tear properties was intrinsic tear. Such films were nothing short of surprising and unexpected.

The samples were compression molded per ASTM D 4703-03 to 4-6 mil. Hysteresis tests were run on compression molded specimens in a tensile tester to an extension of 100% or 300% and returned to zero load. The tests were performed at a cross head speed of 508 mm/min. The test condition corresponding to the first cycle is designated "as is," and the second cycle is designated as "pre stretch." The pre stretch test conditions also correspond to 100% or 300% extension and return to zero load. Permanent set and load loss properties as defined below were calculated for both "as is" and "pre stretch" conditions.

Permanent Set (%): Strain level corresponding to zero force on return, upon stretching a non woven fabric to 100% extension. This can be done either in the machine direction or the transverse direction.

Load Loss (%): (Load on Ascending Curve—Load on Descending Curve)/Load on Ascending calculated at the 50% strain level.

Hysteresis (lb-in/in): Area enclosed by the ascending and descending portion of the load displacement curve.

Mechanical Hysteresis (lb-in/in): Area under the ascending portion of the load displacement curve.

Hysteresis (%): Hysteresis/Mechanical Hysteresis.

PS: Pre stretch to 100% strain.

Intrinsic tear was measured according ASTM D-1922-03.

Tensile tests were performed according to ASTM D-638

Example 1

Table 1 shows blend examples comprising a propylene based polymer designated Copolymer A (available from ExxonMobil Chemical Company), a styrenic block copolymer (D4211) and hydrocarbon resin based polymer additive (PR 100A), compounded in a 30 mm ZSK twin screw extruder. The ingredients were tumble blended to a total weight of 5000 gm, and introduced into the hopper of the twin screw extruder. The melt temperature was maintained at 210° C. The extrudate was cooled in a water trough and pelletized for testing.

Example C1 is a comparative example based on Copolymer A that was not compounded, and directly converted to test specimens. Example 2 shows a recipe containing 15 wt. % PR 100A. As seen in Table 1, the intrinsic tear properties were substantially enhanced from 1.6 gm/micron for C1 to 3.9 gm/micron for Example 2. Both permanent set and load loss remained essentially unchanged. Copolymer A is a propylene-based polymer containing about 16 wt % ethylene, 3 g/10 min MFR, and a heat of fusion of about 5 J/g.

Example 3 contained D4211 as a third ingredient. This example exhibited a substantial increase in intrinsic tear relative to C1 (2.6 gm/micron) without compromising the elastic properties.

TABLE 1

Properties of Copolymer A films modified with PR 100A

| | | EXAMPLE | | |
|---|---|---|---|---|
| | | C1 | 2 | 3 |
| Copolymer A | | 100.0 | 85.0 | 70.0 |
| D4211 (14.3 MFR, 0.936 d) | | 0.0 | 0.0 | 21.5 |
| PR 100A | | 0.0 | 15.0 | 8.5 |
| Irganox 1010 | | 0.5 | 0.5 | 0.5 |
| Total | | 100.5 | 100.5 | 100.5 |
| Compression Molded to 9 mil (0.23 mm) thickness | | | | |
| MFR (230° C., 2.16 Kg) | g/10 min | 3.0 | 4.7 | 5.5 |
| Tensile @ Yield[1] | MPa | 0.9 | 0.1 | 0.7 |
| Tensile @ Brk | MPa | 12.2 | 9.4 | 10.0 |
| Elongation @ Yield | % | 10 | 10 | 10 |
| Elongation @ Brk | % | 757 | 856 | 805 |
| Intrinsic Tear (Average thickness = 0.102 mm) | g/micron | 1.6 | 3.9 | 2.6 |

TABLE 1-continued

Properties of Copolymer A films modified with PR 100A

| | | EXAMPLE | | |
|---|---|---|---|---|
| | | C1 | 2 | 3 |
| Hysterisis As Is (100% Stretch) | | | | |
| Set | % | 19 | 12 | 20 |
| Load Loss @ 50% strain | % | 44 | 45 | 21 |
| Hysterisis Prestretch to 100% and 100% Stretch | | | | |
| Set | % | 18 | 19 | 19 |
| Load Loss @ 50% strain | % | 38 | 44 | 46 |
| Hysterisis As Is (300% Stretch) | | | | |
| Set | % | 50 | 50 | 50 |
| Load Loss @ 150% strain | % | 57 | 57 | 57 |
| Hysterisis Prestretch to 300% and 300% Stretch | | | | |
| Set | % | 46 | 46 | 46 |
| Load Loss @ 150% strain | % | 44 | 44 | 44 |

[1]Thickness: 0.31 mm, Speed 508 mm/mm, Width 25.4 mm, Length 102 mm)

Example 2

Table 2 shows examples of Copolymer A blended with hydrocarbon resin based additives PR 103J or PR 100A in a laboratory PRISM extruder. A batch weight of 500 gm, wherein the ingredients were homogenized though tumble blending, was selected for all the examples. Extrusion compounding was completed at a melt temperature of 210° C., and the extrudates were collected as a solid mass in a cardboard boat spray-coated with silicone to facilitate release. The compound was reduced to smaller fragments in a guillotine and compression molded into test specimens.

From Table 2, it is evident that the addition of PR 103J at progressively increasing levels (Examples 5 through 7) enhanced intrinsic tear properties relative to the comparative example C4, without affecting elastic properties. A similar trend was observed with PR 100A, although in this case about 10 wt. % (Example 9) appears to have provided the optimal enhancement. Surprisingly, a further increase beyond this level resulted in a marginal loss of tear properties as evidenced in Examples 10 and 11. The elastic properties of examples 9 through 11 were similar or in some cases marginally better than the comparative C4. In particular, the permanent set at 300% extension was around 33% in Examples 9 through 11 compared to 42% in comparative C4.

TABLE 2

Copolymer A films modified with mixtures of PR additives

| | | EXAMPLE | | | | | | | |
|---|---|---|---|---|---|---|---|---|---|
| | | C4 | 5 | 6 | 7 | 8 | 9 | 10 | 11 |
| Copolymer A | | 100.0 | 90.0 | 85.0 | 80.0 | 80.0 | 90.0 | 85.0 | 80.0 |
| PR 103J | | 0.0 | 10.0 | 15.0 | 20.0 | 20.0 | 0.0 | 0.0 | 0.0 |
| PR 100A | | 0.0 | 0.0 | 0.0 | 0.0 | 8.5 | 10.0 | 15.0 | 20.0 |
| Irganox 1010 | | 0.0 | 0.5 | 0.5 | 0.5 | 0.5 | 0.5 | 0.5 | 0.5 |
| Total | | 100.0 | 100.5 | 100.5 | 100.5 | 109.0 | 100.5 | 100.5 | 100.5 |
| Compression Mold to 9 mil (0.23 mm) thickness | | | | | | | | | |
| Hardness | Shore A | 46.0 | 42.0 | 39.0 | 40.0 | 35.0 | 42.0 | 40.0 | 40.0 |
| 1% Secant Modulus | MPa | 9.5 | 8.2 | 6.5 | 4.6 | 8.7 | 9.9 | 7.0 | 7.0 |
| Tangent Modulus | MPa | 11.6 | 7.6 | 7.1 | 5.2 | 5.7 | 7.1 | 6.6 | 6.7 |
| Intrinsic Tear (Average = 0.102 mm) | gm/micron | 1.3 | 1.5 | 1.8 | 2.6 | 3.9 | 3.7 | 2.5 | 3.2 |
| Hysterisis As Is (100% Stretch) | | | | | | | | | |
| Set | % | 7 | 7 | 8 | 8 | 8 | 8 | 8 | 7 |
| Load Loss @ 50% strain | % | 38 | 36 | 37 | 37 | 36 | 38 | 37 | 38 |
| Hysterisis Prestretch to 100% and 100% Stretch | | | | | | | | | |
| Set | % | 6 | 6 | 7 | 8 | 7 | 7 | 7 | 5 |
| Load Loss @ 50% strain | % | 26 | 27 | 26 | 29 | 28 | 27 | 27 | 28 |
| Hysterisis As Is (300% Stretch) | | | | | | | | | |
| Set | % | 42 | 34 | 32 | 33 | 32 | 33 | 32 | 33 |
| Load Loss @ 150% strain | % | 59 | 57 | 56 | 54 | 55 | 57 | 56 | 56 |
| Hysterisis Prestretch to 300% and 300% Stretch | | | | | | | | | |
| Set | % | 34 | 28 | 29 | 31 | 30 | 28 | 29 | 29 |
| Load Loss @ 150% strain | % | 45 | 41 | 42 | 42 | 42 | 43 | 43 | 42 |

Example 3

Table 3 shows examples 13-19 containing propylene based polymers Copolymer B or Copolymer C with styrenic block polymer D4211 and PR 103J polymer additive. Copolymer B is a propylene-based polymer containing about 15 wt % ethylene, 3 g/10 min MFR, and a heat of fusion of about 5 J/g. Copolymer C is a propylene-based polymer containing about 14 wt % ethylene, 20 g/10 min MFR, and a heat of fusion of about 10 J/g.

Examples 13-19 were prepared in a 30 mm ZSK twin screw extruder as outlined in Example 1. The comparative examples C12 and C16 were 70/30 blends of Copolymer B and Copolymer C. D4211 was added in Examples 13 and 14. PR 103J was added at the expense of Copolymer B by maintaining the D4211 resin level at 30 wt %. In Example 15, the D4211 was dropped to 20 wt %. Examples 17 through 19 illustrated a similar trend with Copolymer C (20 MFR) as the base resin instead of Copolymer B. Examples 13 through 15 displayed higher tear properties compared to comparative example C12 with a comparable or marginal decrease in elastic properties. Similarly, Examples 17 through 19 exhibited higher tear properties compared to comparative example C16 while maintaining elastic properties.

TABLE 3

Properties of copolymer films modified with PP 103J

|  |  | C12 | 13 | 14 | 15 | C16 | 17 | 18 | 19 |
|---|---|---|---|---|---|---|---|---|---|
| Copolymer B |  | 70 | 60 | 55 | 65 | 0 | 0 | 0 | 0 |
| Copolymer C |  | 0 | 0 | 0 | 0 | 70 | 60 | 55 | 65 |
| D4211 |  | 30 | 30 | 30 | 15 | 30 | 30 | 30 | 15 |
| PR1O3J |  | 0 | 10 | 15 | 20 | 0 | 10 | 15 | 20 |
| Irganox 1010 |  | 0.5 | 0.5 | 0.5 | 0.5 | 0.5 | 0.5 | 0.5 | 0.5 |
| Total |  | 100.5 | 100.5 | 100.5 | 100.5 | 100.5 | 100.5 | 100.5 | 100.5 |
| Compression Mold to 9 mil (0.23 mm) thickness | | | | | | | | | |
| MFR (230° C., 2.16 Kg) | g/10 mil | 6.6 | 9.3 | 17.7 | 16.8 | 22.1 | 35.2 | 39.3 | 41.3 |
| Tensile @ Yield | MPa | 1.0 | 0.8 | 0.7 | 0.6 | 1.0 | 0.7 | 0.7 | 0.7 |
| Tensile @ Brk | MPa | 19.9 | 18.7 | 17.4 | 10.5 | 10.7 | 10.1 | 9.2 | 8.3 |
| Elongation @ Yield | % | 10 | 11 | 12 | 11 | 11 | 10 | 8 | 13 |
| Elongation @ Brk | % | 985 | 1002 | 1058 | 906 | 992 | 1080 | 1137 | 1111 |
| Intrinsic Tear (Average = 0.10 mm) | gm/micron | 2.1 | 2.5 | 3.1 | 5.4 | 1.6 | 2.2 | 3.1 | 4.4 |
| Hysterisis (300% Stretch) | | | | | | | | | |
| Set | % | 50 | 50 | 50 | 53 | 48 | 50 | 52 | 53 |
| Load Loss @ 150% strain | % | 57 | 56 | 52 | 59 | 60 | 56 | 54 | 61 |
| Hysterisis (300% Stretch) | | | | | | | | | |
| Set | % | 46 | 46 | 49 | 54 | 48 | 48 | 53 | 55 |
| Load Loss @ 150% strain | % | 44 | 41 | 41 | 46 | 44 | 41 | 44 | 51 |

Specific embodiments of the invention are further described in the following pararaphs:

1. A film comprising:
   one or more propylene-based polymers having (i) 60 wt % or more units derived from propylene, (ii) isotactically arranged propylene derived sequences, and (iii) a heat of fusion less than 65 J/g; and
   one or more hydrocarbon resins each having a glass transition temperature greater than 20° C.

2. The film according to paragraph 1, wherein the amount of the hydrocarbon resin in the composition is sufficient to increase intrinsic tear of the film by at least 20%.

3. The film of paragraph 1 or 2, wherein the one or more propylene-based polymers has a heat of fusion less than 45 J/g 4. The film according to any of paragraphs 1 to 3, wherein the one or more propylene-based polymers has an ethylene content of from 5 wt % to 16 wt %.

5. The film according to any of paragraphs 1 to 4, wherein the one or more propylene-based polymers has an ethylene content of from 12 wt % to 16 wt %.

6. The film according to any of paragraphs 1 to 5, wherein the one or more propylene-based polymers has an ethylene content of from 15 wt % to 16 wt %.

7. The film according to any of paragraphs 1 to 6, wherein the one or more propylene-based polymers has a melt flow rate (230° C./2.16 Kg) of about 1 g/10 min to about 400 g/10 min.

8. The film according to any of paragraphs 1 to 7, wherein the one or more propylene-based polymers has a melt flow rate (230° C./2.16 Kg) of about 1 g/10 min to about 30 g/10 min.

9. The film according to any of paragraphs 1 to 8, wherein the propylene-based polymer has a melt flow rate (230° C./2.16 Kg) of at least 3.0 g/10 min.

10. The film according to any of paragraphs 1 to 9, wherein the propylene-based polymer has a melt flow rate (230° C./2.16 Kg) of at least 20 g/10 min.

11. The film according to any of paragraphs 1 to 10, wherein the propylene-based polymer has a density of at least 0.80 g/cm$^3$.

12. The film according to any of paragraphs 1 to 11, wherein the propylene-based polymer has a density of about 0.85 g/cm$^3$ or more.

13. The film according to any of paragraphs 1 to 12, wherein the propylene-based polymer has a density of about 0.86 g/cm$^3$ or more.

14. The film according to any of paragraphs 1 to 13, wherein the propylene-based polymer has a melt temperature of less than 110° C.

15. The film according to any of paragraphs 1 to 14, wherein the hydrocarbon resin is a hydrogenated cycloaliphatic resin.

16. The film according to any of paragraphs 1 to 15, wherein the hydrocarbon resin has a molecular weight (Mn) of from 200 to 5000.

17. The film according to any of paragraphs 1 to 16, wherein the hydrocarbon resin has a molecular weight (Mn) of from 200 to 1000.

18. The film according to any of paragraphs 1 to 17, wherein the hydrocarbon resin has a molecular weight (Mn) of from 500 to 1000.

19. The film according to any of paragraphs 1 to 18, wherein the hydrocarbon resin has a softening point of from 80° C. to 180° C.

20. The film according to any of paragraphs 1 to 19, wherein the hydrocarbon resin has a softening point of from 120° C. to 150° C.

21. The film according to any of paragraphs 1 to 20, wherein the hydrocarbon resin has a softening point of from 125° C. to 140° C.

22. A method for making a film composition, comprising:
admixing one or more propylene-based polymers and one or more miscible hydrocarbon resins in an amount sufficient to provide a film having an increase in intrinsic tear by at least 5% compared to a film without either the one or more propylene-based polymers or the one or more miscible hydrocarbon resins,
the propylene-based polymers each having (i) 60 wt % or more units derived from propylene, (ii) isotactically arranged propylene derived sequences, and (iii) a heat of fusion less than 45 J/g; and the hydrocarbon resins each having a glass transition temperature greater than 20° C.

23. The method according to paragraph 22, further comprising polypropylene or one or more thermoplastic resins.

24. The method according to paragraphs 22 or 23, wherein the propylene-based polymer is present in the film in an amount of from 80 to 99 wt % and the hydrocarbon resin is present in an amount of from 1 to 20 wt %, based on the total weight of the film.

25. The method according to any of paragraphs 22 to 24, wherein the propylene-based polymer is present in the composition in an amount of from 80 to 95 wt % and the hydrocarbon resin is present in an amount of from 5 to 20 wt %, based on the total weight of the composition.

26. The method according to any of paragraphs 22 to 25, wherein the intrinsic tear of the film is at least 1.5 gm/micron.

27. The method according to any of paragraphs 22 to 26, wherein the intrinsic tear of the film is at least 2.6 gm/micron.

28. The method according to any of paragraphs 22 to 27, wherein the intrinsic tear of the film is at least 3.9 gm/micron.

29. The method according to any of paragraphs 22 to 28, further comprising one or more styrenic block copolymers.

30. The method according to any of paragraphs 22 to 29, wherein the propylene-based polymer has a melt flow rate (230° C./2.16 Kg) of at least 3.0 g/10 min.

31. The method according to any of paragraphs 22 to 30, wherein the propylene-based polymer has a melt flow rate (230° C./2.16 Kg) of at least 20 g/10 min.

32. The method according to any of paragraphs 22 to 31, wherein the propylene-based polymer has a density of at least 0.80 g/cm$^3$.

33. The method according to any of paragraphs 22 to 32, wherein the propylene-based polymer has a density of about 0.85 g/cm$^3$ or more.

34. The method according to any of paragraphs 22 to 33, wherein the propylene-based polymer has a density of about 0.86 g/cm$^3$ or more.

35. The method according to any of paragraphs 22 to 34, wherein the propylene-based polymer has a melt temperature of less than 110° C.

36. The method according to any of paragraphs 22 to 35, wherein the hydrocarbon resin is a hydrogenated cycloaliphatic resin.

37. The method according to any of paragraphs 22 to 36, wherein the hydrocarbon resin has a molecular weight (Mn) of from 200 to 5000.

38. The method according to any of paragraphs 22 to 37, wherein the hydrocarbon resin has a molecular weight (Mn) of from 200 to 1000.

39. The method according to any of paragraphs 22 to 38, wherein the hydrocarbon resin has a molecular weight (Mn) of from 500 to 1000.

40. The method according to any of paragraphs 22 to 39, wherein the hydrocarbon resin has a softening point of from 80° C. to 180° C.

41. The method according to any of paragraphs 22 to 40, wherein the hydrocarbon resin has a softening point of from 120° C. to 150° C.

42. The method according to any of paragraphs 22 to 41, wherein the hydrocarbon resin has a softening point of from 125° C. to 140° C.

43. A film comprising:
one or more propylene-based polymers having 60 wt % or more units derived from propylene, isotactically arranged propylene derived sequences, a heat of fusion less than 45 J/g, a density of at least 0.80 g/cm$^3$, and a MFR of at least 3.0 g/10 min; and
one or more hydrogenated cycloaliphatic resin each having a molecular weight (Mn) of from 200 to 5,000 and a glass transition temperature greater than 20° C., wherein the amount of the hydrocarbon resin in the composition is sufficient to increase intrinsic tear of the film by at least 5%.

44. The film according to paragraph 43, wherein the hydrocarbon resin has a softening point of from 125° C. to 140° C.

45. The film according to paragraphs 43 or 44, wherein the intrinsic tear of the film is at least 3.9 gm/micron.

46. The film according to any of paragraphs 43 to 45, wherein the film is a blown film.

47. The film according to any of paragraphs 43 to 46, wherein the film is a blown film.

48. The film according to any of paragraphs 43 to 47, further comprising polypropylene or one or more thermoplastic resins.

49. The film according to any of paragraphs 43 to 48, wherein the propylene-based polymer is present in the film in an amount of from 80 to 99 wt % and the hydrocarbon resin is present in an amount of from 1 to 20 wt %, based on the total weight of the film.

50. The film according to any of paragraphs 43 to 49, wherein the propylene-based polymer is present in the composition in an amount of from 80 to 95 wt % and the hydrocarbon resin is present in an amount of from 5 to 20 wt %, based on the total weight of the composition.

51. The film according to any of paragraphs 43 to 50, wherein the intrinsic tear of the film is at least 1.5 gm/micron.

52. The film according to any of paragraphs 43 to 51, wherein the intrinsic tear of the film is at least 2.6 gm/micron.

53. The film according to any of paragraphs 43 to 52, wherein the intrinsic tear of the film is at least 3.9 gm/micron.

54. The film according to any of paragraphs 43 to 53, further comprising one or more styrenic block copolymers.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

Although the present invention has been described in considerable detail with reference to certain aspects and embodiments thereof, other aspects and embodiments are possible. Therefore, the spirit and scope of the appended claims should not be limited to the description of the versions contained herein.

The invention claimed is:

1. A method for making a film composition, comprising:
   admixing one or more propylene-based polymers, one or more miscible hydrocarbon resins, and one or more styrenic block copolymers in an amount sufficient to form a blend which provides a film having an increase in intrinsic tear by at least 5% as compared to a film formed from the propylene-based polymers alone,
   wherein the blend comprises at least 55 wt % of the one or more propylene-based polymers, based on the weight of the blend,
   wherein the propylene-based polymers have (i) 60 wt % or more units derived from propylene, (ii) isotactically arranged propylene derived sequences, (iii) a heat of fusion less than 45 J/g, and (iv) a melting point of equal to or less than 100° C.; and
   wherein the hydrocarbon resins have a glass transition temperature greater than 20° C.

2. The method of claim 1, wherein the blend further comprises polypropylene or one or more thermoplastic resins having a melting point above 110° C.

3. The method of claim 1, wherein the propylene-based polymer is present in the film in an amount of from 80 to 99 wt % and the hydrocarbon resin is present in an amount of from 1 to 20 wt %, based on the total weight of the film.

4. The method of claim 1, wherein the intrinsic tear of the film is at least 1.5 gm/micron.

5. The method of claim 1, further comprising one or more styrenic block copolymers.

6. The method of claim 1, wherein the propylene-based polymer has a melt flow rate (230° C./2.16 Kg) of at least 3.0 g/10 min.

7. The method of claim 1, wherein the propylene-based polymer has a density of at least 0.80 g/cm$^3$.

8. The method of claim 1, wherein the hydrocarbon resin is a hydrogenated cycloaliphatic resin.

9. The method of claim 1, wherein the hydrocarbon resin has a molecular weight (Mn) of from 200 to 5000.

10. The method of claim 1, wherein the hydrocarbon resin has a softening point of from 80° C. to 180° C.

11. The method of claim 1, wherein the styrenic block copolymer is a styrene/conjugated/diene/styrene triblock copolymer.

12. The method of claim 1, wherein the styrenic block copolymer comprises about 25 to about 35 wt % styrene.

* * * * *